Sept. 23, 1947.    G. G. RAYMOND    2,427,922
DETACHABLE DENSITOMETER ARM COMPRISING
COMBINED HINGING AND BIASING MEANS
Filed March 1, 1945    2 Sheets-Sheet 1

INVENTOR.
George G. Raymond.
BY
ATTORNEYS.

Sept. 23, 1947.  G. G. RAYMOND  2,427,922
DETACHABLE DENSITOMETER ARM COMPRISING
COMBINED HINGING AND BIASING MEANS
Filed March 1, 1945          2 Sheets-Sheet 2
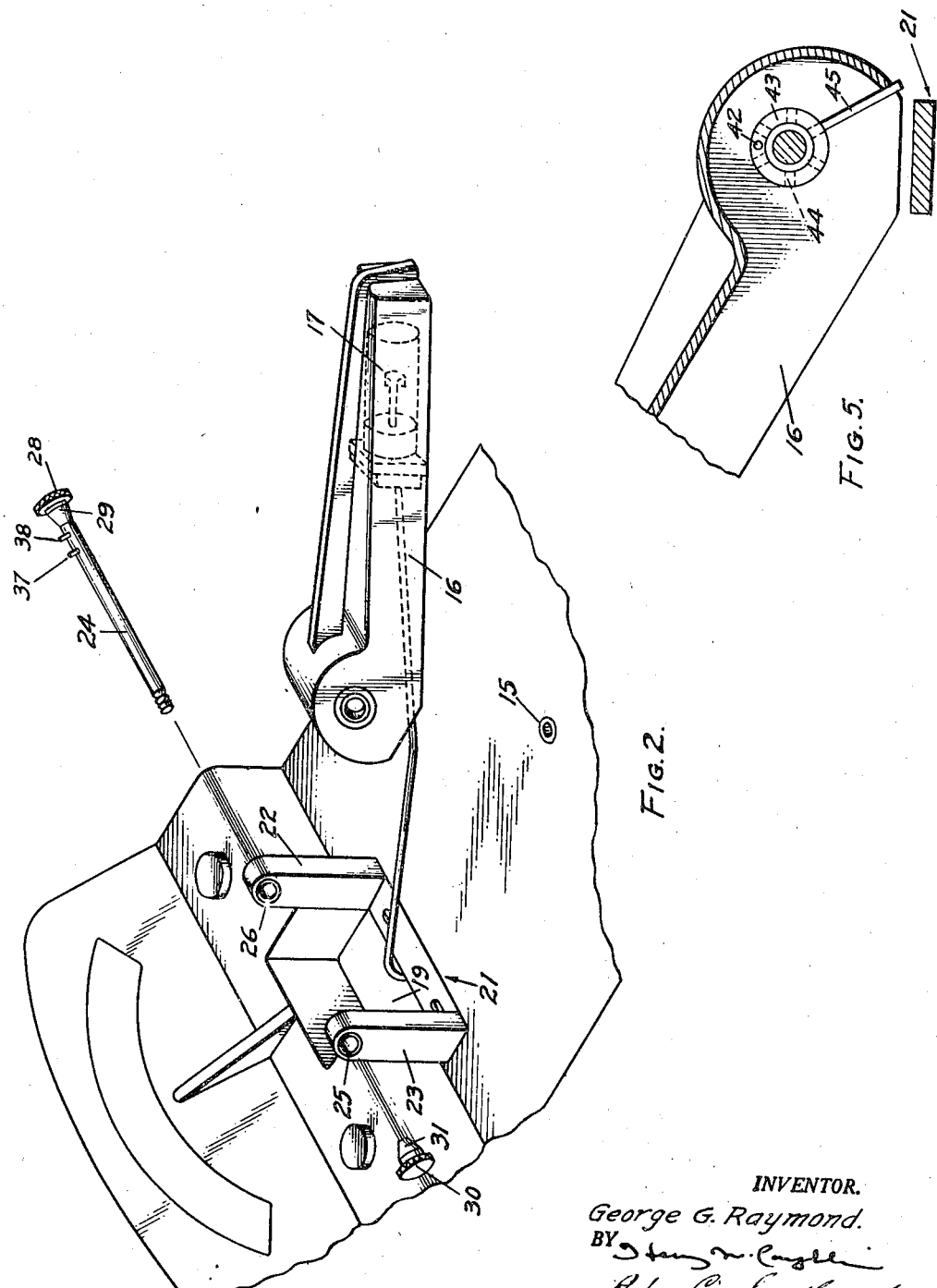
INVENTOR.
George G. Raymond.
BY
ATTORNEYS.

Patented Sept. 23, 1947

2,427,922

UNITED STATES PATENT OFFICE 2,427,922

DETACHABLE DENSITOMETER ARM COMPRISING COMBINED HINGING AND BIASING MEANS

George G. Raymond, Binghamton, N. Y., assignor to General Aniline & Film Corporation, New York, N. Y., a corporation of Delaware Application March 1, 1945, Serial No. 580,436

5 Claims. (Cl. 88—14)

This disclosure pertains to an invention in a densitometer, and more specifically to a hinge construction between the removable measuring arm and the casing, which is formed in part as an integral portion of the arm itself. The invention is described relative to a particular densitometer of the photo-electric type, although it is to be understood that it is applicable to all densitometers of similar nature.

Among the objects of the invention is that of providing for quick removal of the so-called measuring arm, that is, the arm which carries the photo-sensitive element, such as a photo-electric cell or a vacuum phototube. The particular instrument described is of such construction that both a photoelectric tube and an amplifier tube, as well as certain high impedance connections, are carried within the removable arm which acts to shield those electronic elements and thereby to prevent inaccuracies of measurement as the arm is removed from the casing to apply the photo-sensitive element at points remote from the remainder of the instrument which is housed within the casing.

It is an object of the invention to provide a hinge bracket which shall be attachable and detachable from the casing thereby to simplify the design and manufacture of the instrument. It is a further object of the invention to so construct the hinge bracket that it shall be adjustable thereby to provide for alignment of the arm so that when in operative position, its photo-sensitive element may be brought into exact registration with the lighted area at which density is to be measured. It is a further object to provide a self-contained hinge portion which is a functionally integral part of the removable arm and which provides for biasing that arm about the hinge so as to maintain the arm in elevated position. It is also an object to provide in conjunction with the hinge portion contained within the arm a stop limiting the movement of the arm by the biasing means, also to provide adjustment for both the biasing and the stopping means.

It is a further object to provide removable hinge parts which are very easily inserted in position and which when in position, tend to maintain alignment of the swinging arm. The above mentioned objects have been attained while greatly simplifying the mechanism over that previously employed, while at the same time, all of the parts incidental to the invention are of a type easily fabricated thereby reducing costs.

The invention will now be described by reference to one specific embodiment thereof which is shown in the accompanying figures of drawing in which:

Fig. 2 is a perspective view, parts being shown exploded, and the measuring arm being slightly removed from its normal position.

Fig. 5 is a section taken at line 5—5, Fig. 4.

Figure 1:
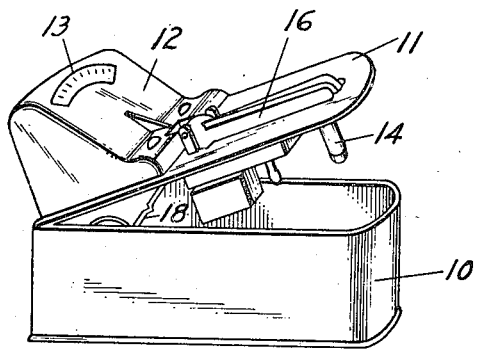
Fig. 1 is a perspective view showing the invention as applied to a densitometer, the cover of the instrument being raised.

Now referring to Figs. 1 and 2, the instrument includes a case 10 and a cover 11 which is hinged to be swung upwardly as shown in Fig. 1 and which also carries certain parts of the electrical mechanism attached to its underside. Hereinafter the combined case and cover will be referred to as the casing. Above the cover is a housing 12 within which is enclosed a microammeter, the indications of which are read on the scale 13 which is graduated in terms of density. The instrument is provided with a source of illumination at 14, light rays from which are condensed and projected up through a small window 15 above which the specimen, the density of which is to be determined, is placed. The measuring arm 16 is hinged to be swung from a raised or angular position as indicated in Fig. 5 to the position it occupies in Fig. 1, at which time the photo-sensitive element, preferably a vacuum phototube 17, is brought into alignment with the illuminated area of the specimen and also into close proximity to that area. At that time, the density may be read on the scale 13.

At times, it is desirable to remove the arm 16 and employ it and its enclosed photo-responsive element for measuring light, density, etc., at a point remote from the casing and other parts of the instrument. That may be done by disconnecting the hinge hereinafter to be described, whereupon the arm may be extended for "exploring," the limits of its extension being determined by the length of the cable or cord 18 which runs through an opening 19 in the casing cover.

Figure 3:
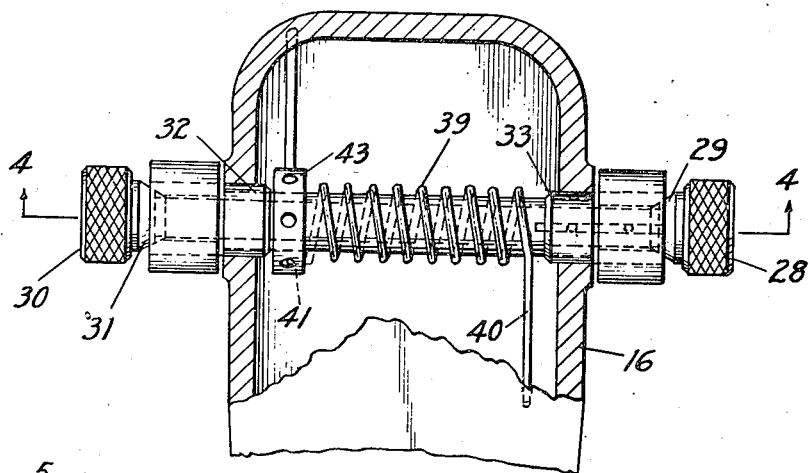
Fig. 3 is a top view of the hinge and part of the arm, the arm being shown in section to illustrate more clearly elements which are contained therein.
Figure 4:
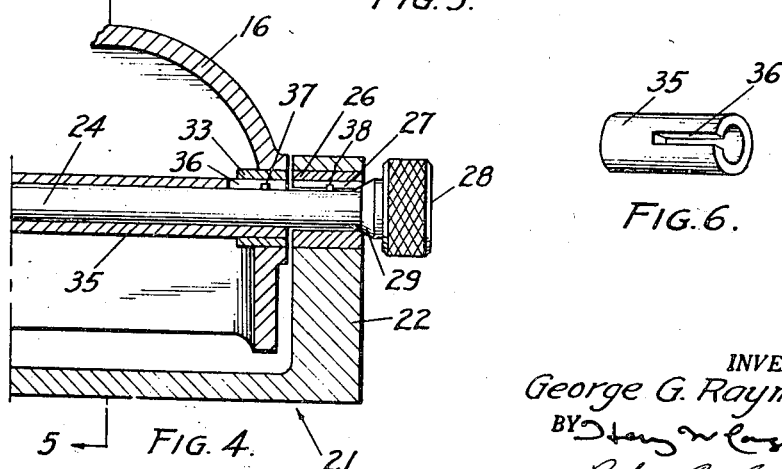
Fig. 4 is a section taken at line 4—4, Fig. 3.

Now referring to the remaining figures, in addition to Figs. 1 and 2, the hinge may be divided into units, comprising one which remains a part of the casing, another of which forms a part and always remains within the arm, and a connecting pin. The pin serves to retain the arm in position on the casing, to maintain alignment of the parts, and to render effective the biasing and stop means. That portion of the hinge which remains a functional part of the casing includes a bracket generally indicated by numeral 21 which is retained in position by screws or other attaching means which pass through oversized holes or slots in the horizontal part of the bracket, or in the casing, depending upon whether they are inserted from above or below. Preferably the bracket is set into a recess in the casing cover 11. The upstanding extensions of the bracket indicated by numerals 22 and 23 are drilled for reception of bushings which receive the hinge pin 24. It is not absolutely essential that bushings be employed, but manufacture is simplified and the construction rendered more effective if they are used. The extension 23 has a bushing 25 pressed into the hole drilled for its reception, while the opposite extension 22 has a similar bushing 26, the bushing 26 differing from that at 25 in that it has a slot or keyway 27, shown more clearly in Fig. 4. The bushing 25 is merely drilled concentrically for the reception of the pin 24, but both bushings are countersunk or tapered at their outer ends as illustrated in Figs. 3 and 4. They are pressed into position with sufficient force to resist turning or otherwise becoming displaced.

The pin 24 has a knurled head 28 at one end and adjacent that head a tapered portion indicated by numeral 29. Its opposite end is threaded for the reception of nut 30 which is also knurled and formed similarly to the head 28. It also has tapered extension 31 similar to the above described tapered portion 29. The head and tapered part may be formed integrally with the pin or separately and attached to it.

Figure 6:
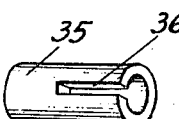
Fig. 6 is a perspective view of one end of one of the parts contained within the arm.

The so-called measuring arm 16 also has bushings 32 and 33 which are pressed into position. Within and free to rotate in the bushings, except as otherwise limited, is a sleeve 35 which is slotted at 36, Figs. 3, 4 and 6. The pin 24 has a working fit within the sleeve 35 and is provided with small projections 37 and 38 which are in alignment along the length of the pin and of proper size to engage within the slots 27 and 36. Thus, when the arm is to be attached for operation at the instrument casing, it is merely placed in position so that the center of the hinge parts carried by the arm is in approximate alignment with the bushings 25 and 26. Then the pin is pushed into position and projections 37 and 38 aligned to slide into slot 27. The arm may be rotated slightly about the hinge center so that the slot 36 may be engaged by projection 37. After the pin has been pushed in to its fullest extent and, of course, has entered the bushing 25, the nut 30 may be screwed on to the threaded end of the pin, it being set up as tightly as may be conveniently done by manual force applied to the knurled head of the nut. The tapered extensions 29 and 31 enter the countersunk ends of the bushings, and thereby center the pin very accurately in the bracket. That provides for proper alignment, even though the pin may have a relatively loose fit within the bushings. Of course, the sleeve 35 has a relatively tight but working fit within the bushings 32 and 33, and pin 24 acts as a similar bearing within the sleeve 35. Thus, the arm may be constructed so that the photosensitive element will have correct registration with the window 15 and will automatically assume proper alignment upon subsequent reattachment after use at some remote point.

From so much of the apparatus as has been described to this point, it can be seen that the hinge provides for rotation of the arm upon bearing surfaces within bushings 32 and 33 and upon the sleeve 35. So as to bias the arm about the hinge and to maintain it in an elevated position except when moved to the position of Fig. 1, a spring 39 is coiled about the sleeve and has an extending end 40 which engages against the underside of the top surface of the arm. At the opposite end of the coiled spring, a short projection 41 is entered within drilled hole 42 in collar 43, Figs. 3 and 5. This collar 43 is adjustable about the sleeve 35 and is retained in properly adjusted position by a set screw. There are several tapped holes 44 and any convenient one of them is used for the retaining set screw. To prevent excessive upward movement of the arm under the influence of spring 39, a stop pin 45 as is threaded into one of the tapped holes 44 as illustrated in Fig. 5. The adjustment of the collar 43 is, of course, so made as to position the pin 45 in proper angular relationship to stop the upward movement of the arm at a desired position. The tension imposed on spring 39 is thus something of a compromise between that tension desired and what is necessary fro proper positioning of the pin. However, the length of the spring is such that in conjunction with the relatively small angle between the tapped holes 44, the tension may be set at practically any amount required. The stop pin 45 also acts as a set screw for locking collar 43 in position.

While one embodiment of the invention has been disclosed, it is to be understood that the inventive concept may be carried out in a number of ways. This invention is, therefore, not to be limited to the precise details described but is intended to cover all variations and modifications thereof falling within the spirit of the invention and the scope of the claims.

I claim:

1. In a densitometer, the combination of a casing, an arm removably hinged to said casing, a light source within the casing and an opening in said casing through which light from said source is directed, a light-sensitive phototube carried by said arm and positioned to receive light directed through said opening, an indicating meter at the casing and an extensible electrical connection from the meter to the light-sensitive phototube, the hinge for said arm including hinge parts, some of which are attached to the casing and others of which are functionally integral parts of the arm, those parts of the hinge attached to the casing comprising aligned bearings, said arm having similar aligned bearings, a sleeve inserted within the last-mentioned bearings and on which the arm is rotatably mounted, a removable pin passing through the first-mentioned bearings and through the sleeve, means on the pin engaged with one of the first-mentioned bearings and the sleeve to prevent rotation of one relative to the other, and biasing means enclosed within said arm and carried by the sleeve and tending to move the arm in one direction about the sleeve.

2. In a densitometer, the combination of a casing, an arm removably hinged to said casing, a light source within the casing and an opening in said casing through which light from said source is directed, a light-sensitive phototube carried by said arm and positioned to receive light directed through said opening, an indicating meter at the casing and an extensible electrical connection from the meter to the light-sensitive photo-tube, the hinge for said arm including hinge parts, some of which are attached to the casing and others of which are functionally integral parts of the arm, those parts of the hinge attached to the casing comprising a bracket with upstanding projections adjacent the ends of which are aligned bearings, similar aligned bearings in said arm, a sleeve inserted within the last-mentioned bearings and on which the arm is rotatably mounted, a removable hinge pin inserted through the bearings in the projections from said bracket and through the sleeve, said pin having a tapered portion at one end engaged in one of the bearings in the bracket and a nut threadedly engaged with the other end of the pin, said nut having a tapered portion engaged within the other bearing in the bracket, means on the hinge pin engaged in one of the bearings in the bracket and with the sleeve to prevent rotation of one relative to the other, and biasing means enclosed within said arm and carried by the sleeve and tending to move the arm in one direction about the sleeve.

3. In a densitometer, the combination of a casing, an arm removably hinged to said casing, a light source within the casing and an opening in said casing through which light from said source is directed, a light-sensitive phototube carried by said arm and positioned to receive light directed through said opening, an indicating meter at the casing and an extensible electrical connection from the meter to the light-sensitive phototube, the hinge for said arm including hinge parts some of which are attached to the casing and others of which are functionally integral parts of the arm, those parts of the hinge attached to the casing comprising a bracket with upstanding projections adjacent the ends of which are aligned bushings, a longitudinally extending slot in one of said bushings, bushings in said arm aligned with those in the bracket, a sleeve inserted within the last-mentioned bushings and on which the arm is rotatably mounted, a slot in said sleeve at the end thereof adjacent that bushing having a slot, a removable pin inserted through said bushings in the bracket and through the sleeve, said pin having a tapered portion at one end engaged with a similarly tapered end of one of the bushings in the bracket and a nut threadedly engaged with the other end of the pin, said nut having a tapered portion engaged within a tapered end of the other bushing in the bracket, projections from said pin, one of which engages within the slot in the bushing and the other of which engages the slot in the sleeve, and spring biasing means enclosed within said arm and carried by the sleeve and tending to move the arm in one direction about the sleeve.

4. In a densitometer, the combination of a casing, an arm removably hinged to said casing, a light source within the casing and an opening in said casing through which light from said source is directed, a light-sensitive phototube carried by said arm and positioned to receive light directed through said opening, an indicating meter at the casing and an extensible electrical connection from the meter to the light-sensitive phototube, the hinge for said arm including a part attached to the casing comprising a bracket with upstanding projections adjacent the ends of which are aligned bushings, a longitudinally extending slot in one of said bushings, bushings in said arm aligned with those in the bracket, a sleeve upon which said arm and its bushings are rotatable and a slot in said sleeve at the end thereof adjacent that bushing having a slot, a removable pin extending through said bushings in the bracket and through the sleeve, said pin having a tapered portion at one end engaged in a similarly tapered end of one of the bushings in the bracket and a nut threadedly engaged with the other end of the pin and having a tapered portion engaged with a tapered end of the other bushing in the bracket, projections from said pin, one of which engages within the slot in the bushing and the other of which engages the slot in the sleeve, and spring biasing means tending to move the arm upwardly about the relatively stationary sleeve, said biasing means comprising a coiled spring surrounding said sleeve, a projecting end of said spring engaged with the arm, a collar on said sleeve having an opening within which a projection from the other end of said spring is retained, means for clamping said collar in a rotatively adjusted position on the sleeve thereby to provide adjustment for the tension of said spring and to resist movement of the spring about the sleeve thereby causing the spring to urge the arm to a raised position.

5. In a densitometer, the combination of a casing, an are removably hinged to said casing, a light source within the casing and an opening in said casing through which light from said source is directed, a light-sensitive phototube carried by said arm and positioned to receive light directed through said opening, an indicating meter at the casing and an extensible electrical connection from the meter to the light-sensitive phototube, the hinge for said arm including a part attached to the casing comprising a bracket with upstanding projections adjacent the ends of which are aligned bushings, a longitudinally extending slot in one of said bushings, bushings in said arm aligned with those in the bracket, a sleeve upon which said arm and its bushings are rotatable and a slot in said sleeve at the end thereof adjacent that bushing having a slot, a removable pin extending through said bushings in the bracket and through the sleeve, said pins having a tapered portion at one end engaged with a similarly tapered end of one of the bushings in the bracket and a nut threadedly engaged with the other end of the pin and having a tapered portion engaged with a tapered end of the other bushing in the bracket, projections from said pin, one of which engages within the slot in the bushing and the other of which engages the slot in the sleeve, and spring biasing means tending to move the arm upwardly about the relatively stationary sleeve, said biasing means comprising a coiled spring surrounding said sleeve, a projecting end of said spring engaged with the arm, a collar on said sleeve having an opening within which a projection from the other end of said spring is retained, means for clamping said collar in a rotatively adjusted position on the sleeve thereby to provide adjustment for the tension of said spring and to resist movement of the spring about the sleeve thereby causing the spring to urge the arm to a raised position, and a stop pin carried by said collar and engageable by a part of the arm when it has been moved to said raised position.

GEORGE G. RAYMOND.

REFERENCES CITED

The following references are of record in the file of this patent:

FOREIGN PATENTS

| Number | Country | Date |
| --- | --- | --- |
| 436,456 | Great Britain | Oct. 11, 1935 |

OTHER REFERENCES

"A Precision Direct-Reading Densitometer," by M. H. Sweet, an article in Journal of the Society of Motion Picture Engineers for February 1942; pages 153, 159 and 160 cited.